April 19, 1949.  A. A. GRAY ET AL  2,467,666
BLANK CUTTING MACHINE
Filed Sept. 15, 1947  2 Sheets-Sheet 1
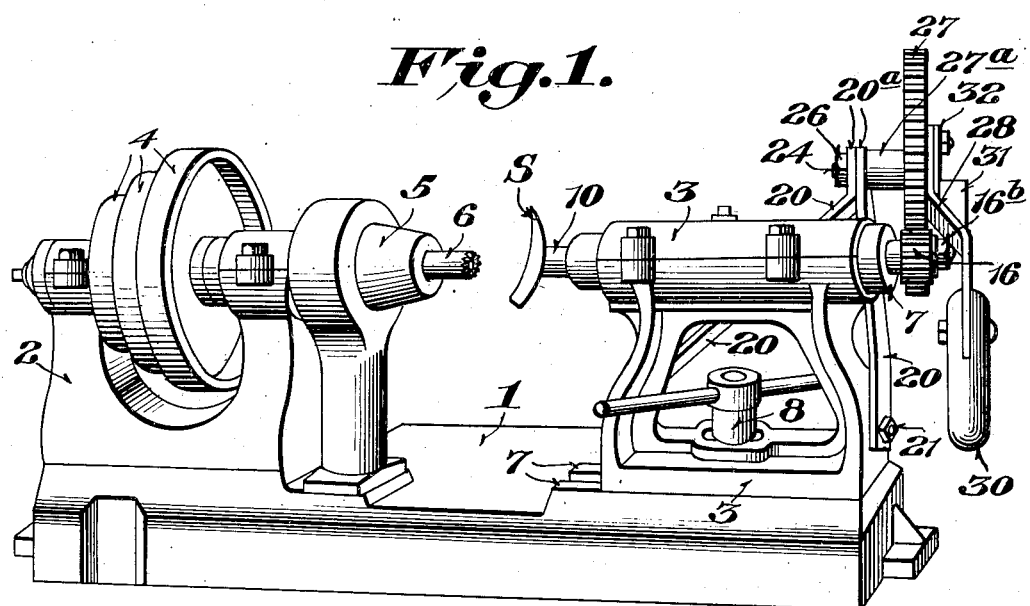
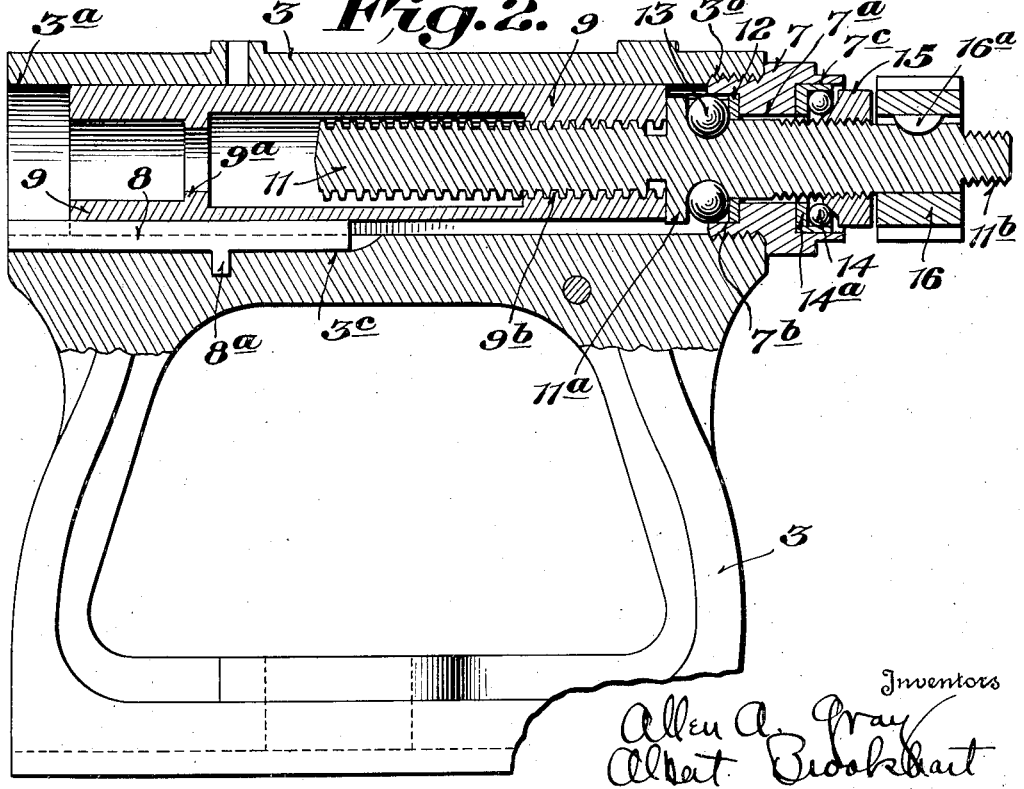

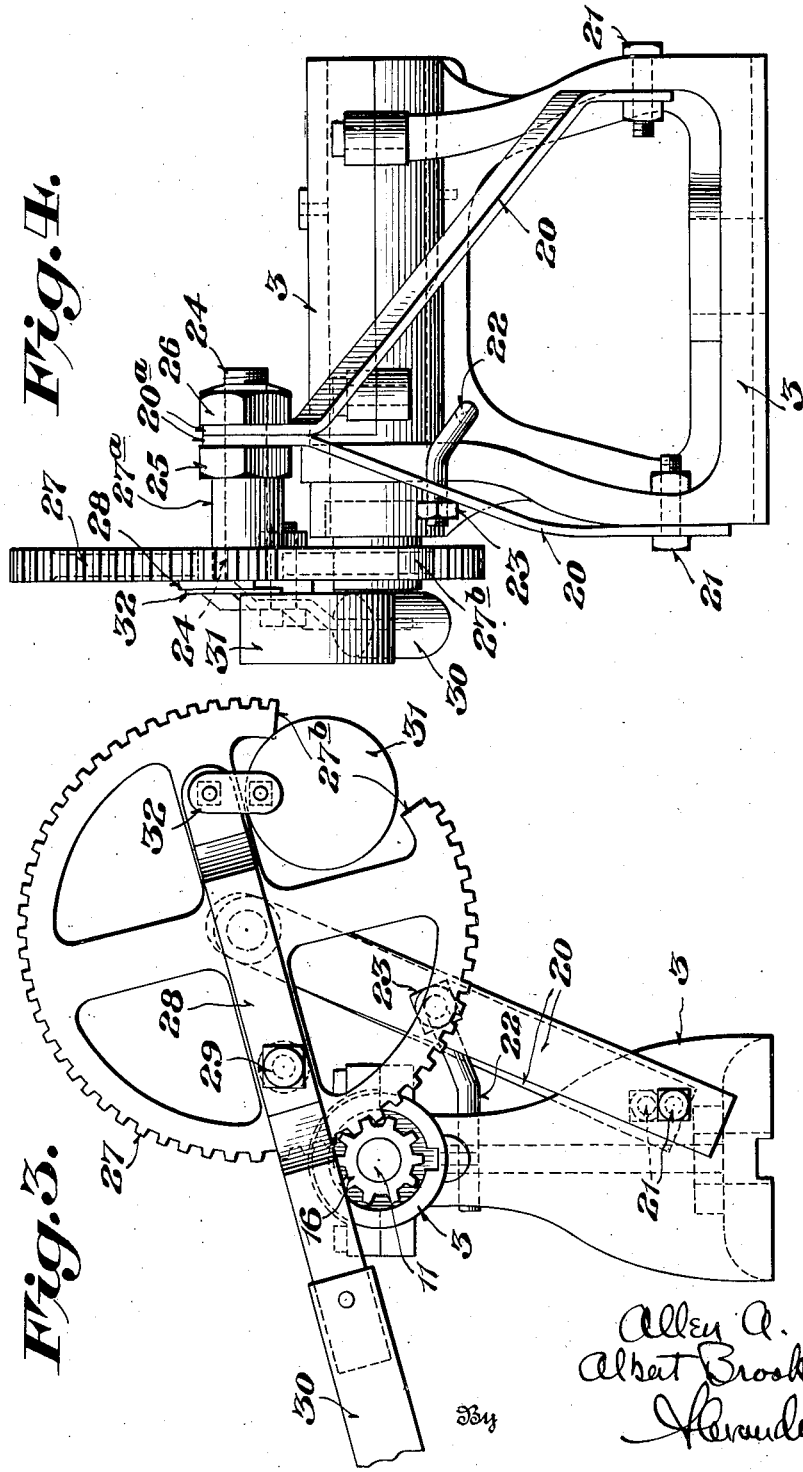

Patented Apr. 19, 1949

2,467,666

UNITED STATES PATENT OFFICE 2,467,666

BLANK CUTTING MACHINE

Allen A. Gray and Albert Brookhart,
Muscatine, Iowa

Application September 15, 1947, Serial No. 774,136

7 Claims. (Cl. 79—16)

Our invention is a novel improvement in button blank cutting machines of the type shown in U. S. Letters Patent No. 659,191, issued October 2, 1900, to N. Barry, Jr., and the principal object thereof is to provide a simple, novel and efficient manually operated means for advancing and retracting the feed plunger of the tail stock of such machines.

Ordinarily the tail stock of such blank cutting machines includes a plunger, screw, thrust bearing, and ratchet. The tail stock is bored to suit the diameter of the plunger which has a keyway; and in the bore of the tail stock is a stationary key on which the plunger slides, allowing the plunger to advance and retract without turning. The plunger has, at its end near the tubular saw, a bore into which is fitted a wooden plug, while the other end of the plunger has a tapped bore into which the screw is threaded, the screw being held against axial movement by the thrust bearing. The end of the screw which protrudes beyond the thrust bearing carries the ratchet which is usually provided with handles to permit turning so that the screw will run the plunger forwards and backwards. This permits the wooden plug to be positioned up against the back of the shell to be cut, the plug holding the shell against the tubular saw which has teeth for cutting out button blank from the shell. After the blank has been cut the handles are swung to return the plunger to starting position. Our invention eliminates the necessity of using this ratchet.

We will explain the invention with reference to the accompanying drawings, which illustrate one practical embodiment thereof, to enable others familiar with the art to adopt and use the same; and will summarize in the claims, the novel features of construction, and novel combinations of parts, for which protection is desired.

In said drawings:

Figure 1 is a perspective view of a button blank cutting machine embodying our invention.

Fig. 2 is an enlarged longitudinal section through the tail stock thereof.

Fig. 3 is an end elevation of the tail stock.

Fig. 4 is a side elevation of the tail stock.

As shown, the button blank cutting machine comprises a base 1 (Fig. 1), having at one end a head stock 2 and at the opposite end a tail stock 3. Journaled in head stock 2 is a shaft carrying a stepped belt pulley in the usual manner whereby the shaft may be rotated at different speeds. At the inner end of the shaft of head stock 2 is a collet 5 in which is mounted a tubular cutting saw 6.

The tail stock 3 is axially shiftable on guides 7 on base 1 toward or from the head stock 2 and is securely bound in adjusted position by means of clamp 8. Tail stock 3 is provided with a cylindrical bore 3a (Fig. 2) in alignment with the tubular saw 6, said bore having its outer end internally threaded as at 3b for the reception of a plug-nut 7 having a bore 7a of less diameter than the bore 3a of the tail stock. The inner end of bore 3a is provided with a keyway 3c for a key 8 which is held axially therein by means of a lug 8a entering a recess in the bottom of keyway 3c.

Axially slidably mounted within bore 3a is a plunger 9, which is preferably hollow and has an internal flange 9a adjacent its inner end; and a wooden plug 10 (Fig. 1) is adapted to be inserted into the inner end of the plunger seating against the flange 9a, plug 10 forming a backing for holding the shell S (Fig. 1) against the tubular saw 6 during the cutting operation. The outer end of the bore of plunger 9 is reduced in diameter and is threaded as at 9b for receiving a threaded screw 11 which telescopes the plunger 9, whereby rotation of screw 11 will move the plunger 9 axially of the bore 3a.

As shown in Fig. 2, screw 11 is provided adjacent the plug-nut 7 with an annular flange 11a opposite the enlarged outer end 7b of bore 7a of plug-nut 7, a thrust collar 12 setting against the shoulder at the end of bore 7b. Anti-friction balls 13 are housed around screw 11 between the flange 11a and the thrust collar 12. The outer end of plug-nut 7 is provided with an enlarged bore 7c receiving an anti-friction bearing having one ball race 14a setting in the recess 7c, the balls 14 contacting a ball-race cone 15 threaded upon the outer end of the screw 11. By reason of the above construction, the screw 11 is rotatable within the bore 3a of the tail stock but is prevented from axial movement therein.

On the outer end of screw 11 beyond cone 15 is a pinion 16 which is keyed thereon as at 16a and retained by a nut 16b (Fig. 1) threaded on the reduced outer end 11b of screw 11.

An inverted V-shaped frame 20 is mounted upon the side of the tail stock 3 by means of bolts 21 or the like (Figs. 3 and 4) passing through the lower ends of the legs of the frame and into the tail stock 3, the upper ends of the legs converging and being flanged together as at 20a (Fig. 4). The frame 20 slopes upwardly to one side of the tail stock 3 as shown in Fig. 3, and is held in such position by means of a rod 22 having one end anchored in the tail stock 3 and having its outer end bent and passing through a perforation in one of the legs of the frame 20, a nut 23 preventing withdrawal of the rod 22 from the frame.

A stub-shaft 24 passes through a hole in the contacting flanges 20a and is secured in position therein by nuts 25 and 26, as shown in Fig. 4, so that the shaft will be fixed relatively to the frame 20. Rotatably mounted upon shaft 24 is the hub 27a of a gear 27 of relatively large size and disposed opposite and meshing with the pinion 16 on screw 11, as shown in Figs. 1 and 3. Gear 27 has a gap 27b in its periphery as shown in Fig. 3, of such width that when the gear 27 is rotated to bring the gap opposite pinion 16, the pinion will be unmeshed from the gear 27. Gear 27 is provided with an operating lever 28 which is bolted as at 29 thereto at opposite sides of the shaft 24, lever 28 being provided with a handle 30 at its outer end. In order to counterbalance the weight of the handle 28—30 a weight 31 is suspended by a strap 32 from the gear 27 at the side opposite from the handle 30. The operator can turn the gear 27 to drive the pinion 16 until gap 27b is reached, after which the gear 27 is unmeshed from the pinion 16. At this point the pinion 16 may be readily rotated by the operator's hand. This enables the operator to move the plunger 9 backward and forward within the bore 3a to initially locate the wooden plug 10 to position the shell S against or touching the tubular saw 6, the rotation of the pinion 16 by hand rotating the screw 11 which enages the threaded portion of the plunger 9. When the shell is thus initially located, contacting the tubular saw 6, the operator then further rotates the gear 27 using the increased leverage of the handle 30, thereby returning the gear 27 into mesh with the pinion 16 and forcing the plug 10 further toward tubular saw 6, causing the saw 6 to cut through the shell S and produce a button blank.

We do not limit our invention to the exact form shown in the drawings, for obviously changes may be made therein within the scope of the claims.

We claim:

1. In a button blank cutting machine having a head stock in which is journaled a rotary tubular saw and having a tail stock in which a plunger is slidably mounted axially of the saw, said plunger being actuated by a feed screw; a pinion on said feed screw; a stub shaft mounted on the tail stock parallel with the feed screw; a gear on said shaft normally meshing with said pinion; manual means for rotating said gear; said gear having a gap in its periphery, whereby when the gear is rotated to bring the gap opposite the pinion the gear will be unmeshed from the pinion to permit the latter to be directly manually rotated.

2. In a button blank cutting machine having a head stock in which is journaled a rotary tubular saw and having a tail stock in which a plunger is slidably mounted axially of the saw, said plunger being actuated by a feed screw; a pinion on said feed screw; a stub shaft mounted on the tail stock parallel with the feed screw; a gear on said shaft normally meshing with said pinion; an operating lever mounted on said gear and projecting beyond the periphery thereof; said gear having a gap in its periphery, whereby when the gear is rotated to bring the gap opposite the pinion the gear will be unmeshed from the pinion to permit the latter to be directly manually rotated.

3. In a machine as set forth in claim 2, a counterbalancing weight on the gear at the opposite side from the lever.

4. In a button blank cutting machine having a head stock in which is journaled a rotary tubular saw and having a tail stock in which a plunger is slidably mounted axially of the saw, said plunger being actuated by a feed screw; a pinion on said feed screw; a frame mounted on one side of the tail stock, a stub shaft carried by said frame parallel with the feed screw; a gear freely rotatable on said shaft and normally meshing with said pinion; an operating lever mounted on said gear and projecting beyond the periphery thereof; said gear having a gap in its periphery, whereby when the gear is rotated to bring the gap opposite the pinion the gear will be unmeshed from the pinion to permit the latter to be directly manually rotated.

5. In a machine as set forth in claim 4, a counterbalancing weight on the gear at the opposite side from the lever.

6. In a machine as set forth in claim 4, said frame being of inverted V-shape; said legs converging at their upper ends and having contacting flanges; and said stub shaft passing through an opening in the contacting flanges and carrying heads contacting opposite sides of the said flanges.

7. In a machine as set forth in claim 4, said frame being of inverted V-shape; bolts partially connecting the lower ends of the legs of the frame to the ends of the tail stock; said legs converging at their upper ends and having contacting flanges; a rod anchored to the tail stock and having its outer end passing through a perforation in one leg to maintain the frame in fixed angularity with respect to the tail stock; and said stub shaft passing through an opening in the contacting flanges and carrying nuts at opposite sides of the said flanges.

ALLEN A. GRAY.
ALBERT BROOKHART.

REFERENCES CITED

The following references are of record in the file of this patent:

UNITED STATES PATENTS

| Number | Name | Date |
| --- | --- | --- |
| 303,897 | Thomas | Aug. 19, 1884 |
| 749,079 | Miller | Jan. 5, 1904 |
| 966,253 | Smith | Aug. 2, 1910 |
| 1,068,129 | Hess | July 22, 1913 |
| 1,328,742 | Koch | Jan. 20, 1920 |
| 1,425,007 | Granlund | Aug. 8, 1922 |
| 1,442,794 | Chalmers | Jan. 23, 1923 |